United States Patent [19]

Petit et al.

[11] Patent Number: 5,428,087

[45] Date of Patent: Jun. 27, 1995

[54] MODIFIED POLYVINYL CHLORIDE COMPOSITION

[75] Inventors: Dominique Petit, Housse-Belegny; Michel Ladang, Herve, both of Belgium

[73] Assignee: Norton Company, Worcester, Mass.

[21] Appl. No.: 146,839

[22] Filed: Nov. 2, 1993

Related U.S. Application Data

[63] Continuation of Ser. No. 794,741, Nov. 19, 1991, abandoned, which is a continuation-in-part of Ser. No. 543,231, Jun. 25, 1990, abandoned, which is a continuation of Ser. No. 354,332, May 19, 1989, abandoned.

[51] Int. Cl.⁶ ............................................. C08K 5/09
[52] U.S. Cl. .................................. 524/127; 524/288;
  524/296; 524/507; 524/569; 524/776; 525/129
[58] Field of Search ............... 524/507, 569, 776, 127,
  524/288, 296; 525/129

[56] References Cited

U.S. PATENT DOCUMENTS

| | | | |
|---|---|---|---|
| 3,962,370 | 6/1976 | Hutchinson | 525/455 |
| 4,154,892 | 5/1979 | Glatti et al. | 524/569 |
| 4,581,444 | 4/1986 | Fujino | 524/569 |
| 4,775,558 | 10/1988 | Haas et al. | 525/129 |
| 4,785,037 | 11/1988 | Ikeda et al. | 524/569 |
| 5,043,379 | 8/1991 | Ota et al. | 524/569 |

*Primary Examiner*—Melvyn I. Marquis
*Assistant Examiner*—Mark D. Sweet
*Attorney, Agent, or Firm*—David Bennett; Stephen L. Borst

[57] ABSTRACT

Finished articles made of flexible polyvinyl chloride (PVC) using plastisol technology are improved in terms of resistance to heat and solvents and reduction in plasticizer migration by incorporating into the traditional plastisol ingredients substantial amounts of blocked di- or polyisocyanates and di- or polyols and/or di- or polyamines, which, upon heating react with each other to form a polymer network within the article while the PVC is gelling.

14 Claims, 6 Drawing Sheets

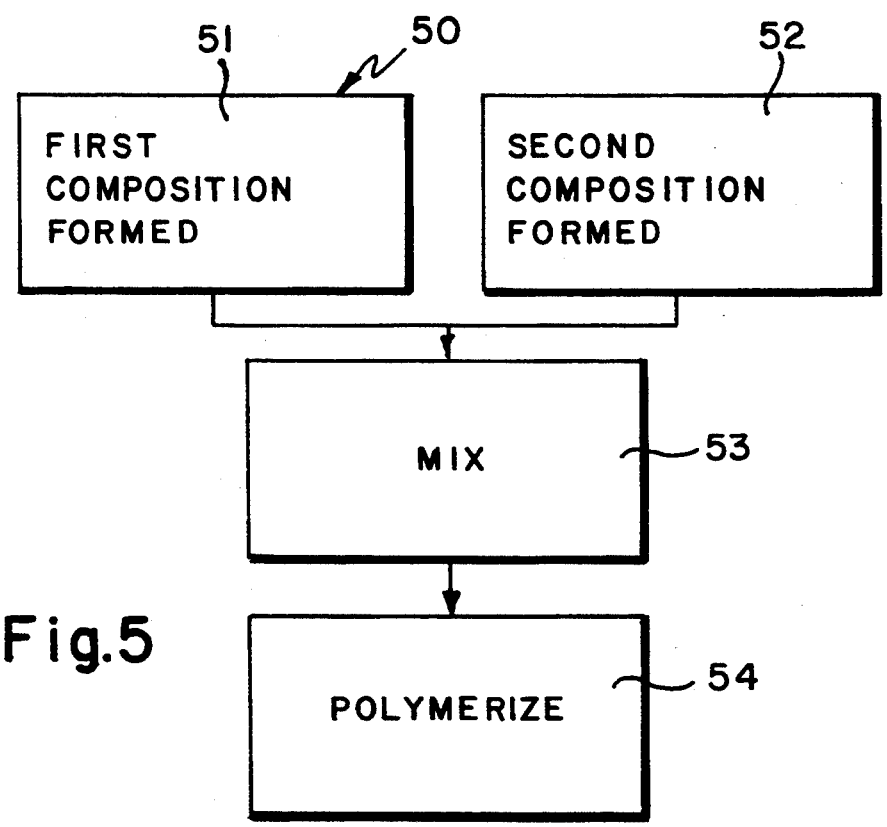

RELATIONSHIP BETWEEN TYPE OF POLYISOCYANATE AND TYPE OF PROCESS

| CHARACTERISTICS OF POLYISOCYANATE / DISPERSABILITY | SPEED | SLOW | FAST |
|---|---|---|---|
| EASY | | FIG. 5 PROCESS | FIG. 2 PROCESS |
| | | IPDI 'MONOMERIC' | 'POLYMERIC' POLYISOCYANATE PA 440 (BASF) |
| | | LOW VISCOSITY, ALIPHATIC POLYISOCYANATE OLIGOMERS | LOW VISCOSITY, AROMATIC POLYISOCYANATE OLIGOMERS |
| DIFFICULT | | FIG. 5 PROCESS | FIG. 3 PROCESS |
| | | IPDI 'ADDUCT' 1530 + 1540 | MDI (POLYMERIC) |
| | | BLOCKED LOW MOLCULAR WEIGHT ISOCYANATES | MDI (POLYMERIC) |

Fig. 6

KEY

| PREFERRED PROCESS |
|---|
| PREFERRED ISOCYANATE |
| ISOCYANATE GENUS |

MODIFIED POLYVINYL CHLORIDE COMPOSITION

CROSS REFERENCE TO RELATED APPLICATIONS

This is a continuation of application Ser. No. 07/794,741 filed Nov. 19, 1991 now abandoned, which is a continuation-in-part of U.S. Ser. No. 07/543,231, filed June 25, 1990, which is a continuation of U.S. Ser. No. 07/354,332, filed May 19, 1989, now abandoned.

BACKGROUND OF THE INVENTION

Polyvinyl chloride (PVC) shows a unique behavior among polymers in that a stable fluid suspension of emulsion or micro-suspension polymerized polyvinyl chloride in a plasticizer (which suspension is known in the art as a "plastisol") can be formed by adding very fine particles of PVC to the plasticizer with relatively simple mixing techniques. When heated above about 120° C., the plastisol forms a homogeneous rubbery polymer product that is similar to the one obtained by the traditional melt extrusion. This process is called gelation and is amply described in the literature, e.g. *PVC Technology* (4th Edition), W.V. Titow (Elevier).

A characteristic feature of PVC is that it does not contain sites of suitable reactivity to enable it conveniently to be crosslinked by reaction with common reagents. Since plasticized polyvinyl chloride is not a crosslinked structure it is prone to flow under sustained stress which does not occur with conventional crosslinked rubbers. Furthermore, the rate of flow of PVC increases more rapidly with increasing temperature than is normally true for crosslinked rubbers. In more practical terms, this means that a highly plasticized polyvinyl chloride body often suffers from excessive creep and stress relaxation, when subjected to sustained stress or strain, especially at elevated temperatures. It is, therefore, unsuitable for applications where sustained stress or strain are to occur unless fabric or other physical reinforcement is provided to restrict irreversible flow.

Another consequence of PVC not solidifying by crosslinking is that it swells in polar solvents to the extent that it completely dissolves in a few of them, tetrahydrofuran (THF) and cyclohexanone being the best known. A further limitation to the use of plasticized PVC has been the tendency of most plasticizers to exude out of a PVC composition over time.

These problems are quite serious and have generally restricted the use of flexible PVC to room temperature applications, such as artificial leather, floor covering, carpet backing, gloves, toys, etc. In glazing applications, there are also limitations against using flexible PVC gaskets, because when the PVC is in direct contact with, for example, Plexiglas ® or polycarbonate glazing sheets, plasticizer migration often causes microcracks in the glazing sheet, thus reducing its mechanical resistance. These and other difficulties experienced with the prior art forms of PVC plastisols have been obviated in a novel manner by the present invention.

U.S.S.R. Inventors Certificate 931,732 discloses plastisol compositions containing only 40-60% PVC, 1-3% polyethyleneglycol, 0.5-2% polyhexamethylene diisocyanate, and the balance dioctylphthalate. With a maximum of only 5% polyurethane, the long term stability of the composition is not effected thereby.

It is, therefore, an object of the invention to provide an article of a solidified PVC plastisol composition which exhibits the characteristics of a vulcanized (crosslinked) polymer, including non-melting and reduced swelling in solvents as compared to a conventional PVC articles.

Another object of this invention is the provision of a process for forming a modified PVC product having an improved resistance to heat and solvents.

A further object of the present invention is the provision of a process for forming a modified PVC which exhibits reduced plasticizer migration.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In general, the invention is an article made from a modified PVC plastisol composition in which a PVC plastisol is improved by the presence of a polyurethane or polyurea network which exists throughout the composition. The molecules which form the polyurethane or polyurea network are reacted in situ, i.e. within the fluid plastisol at the same time the plastisol is gelled. The molecules are (i) a polyisocyanate which is a mixture of a monomer or prepolymer group consisting of blocked diisocyanates, blocked polyisocyanates, and mixtures thereof, and (ii) a monomer or prepolymer group consisting of diols, polyols, diamine, polyamines, and mixtures thereof. The polymerizable molecules could also be adducts formed of the monomers recited above. A preferred isocyanate is an IPDI (isophorone diisocyanate). A preferred polyol is ε-caprolactone (epsiloncaprolactone).

The invention also involves a process for making the above-described articles. The invention differs from conventional plastisol formation, by adding a substantial amount of a stoichiometric mixture of two molecules at various stages in the formation of the plastisol, which molecules will react to form a polyurethane or polyurea polymer in situ after exposure of the complete composition to elevated temperature. When the polymerizable molecules react, a second polymer phase is formed substantially throughout the PVC gelled composition and the second polymer produces a "network-like" structure, which gives the resulting composition improved particles.

The process can be usefully varied by providing a blowing agent in the mixture and causing the agent to expand or foam the mixture prior to the polymerization reaction of the polymerizable molecules. The result is a foamed product with improved properties.

The isocyanate component can be added as a monomer, as a polymer, or as an adduct, but the isocyanate groups must be blocked to enable the composition, which contains more than 20, preferably more than 50, parts of network-forming reactants per 100 parts of PVC, to be successfully produced as a single component final product at a first location and then transported to a second location for actual article-forming use many days later without fear of premature, i.e. unplanned, gellation/network formation which would make the fluid composition useless. Where the network-forming polymer represents less than about 20% of the total composition, there is generally not a need to use blocked isocyanates since the small amount thereof is not sufficient to solidify a fluid plastisol at room temperature.

BRIEF DESCRIPTION OF THE DRAWINGS

The character of the invention, however, may be best understood by reference to one of its structural forms, as illustrated by the accompanying drawings in which:

FIG. 5 is a flow chart of the steps of a generalized view of the process.

FIG. 6 is a chart showing which of the processes is preferred for each of the various polyisocyanates.

DESCRIPTION OF THE PREFERRED EMBODIMENTS

Figure 1:
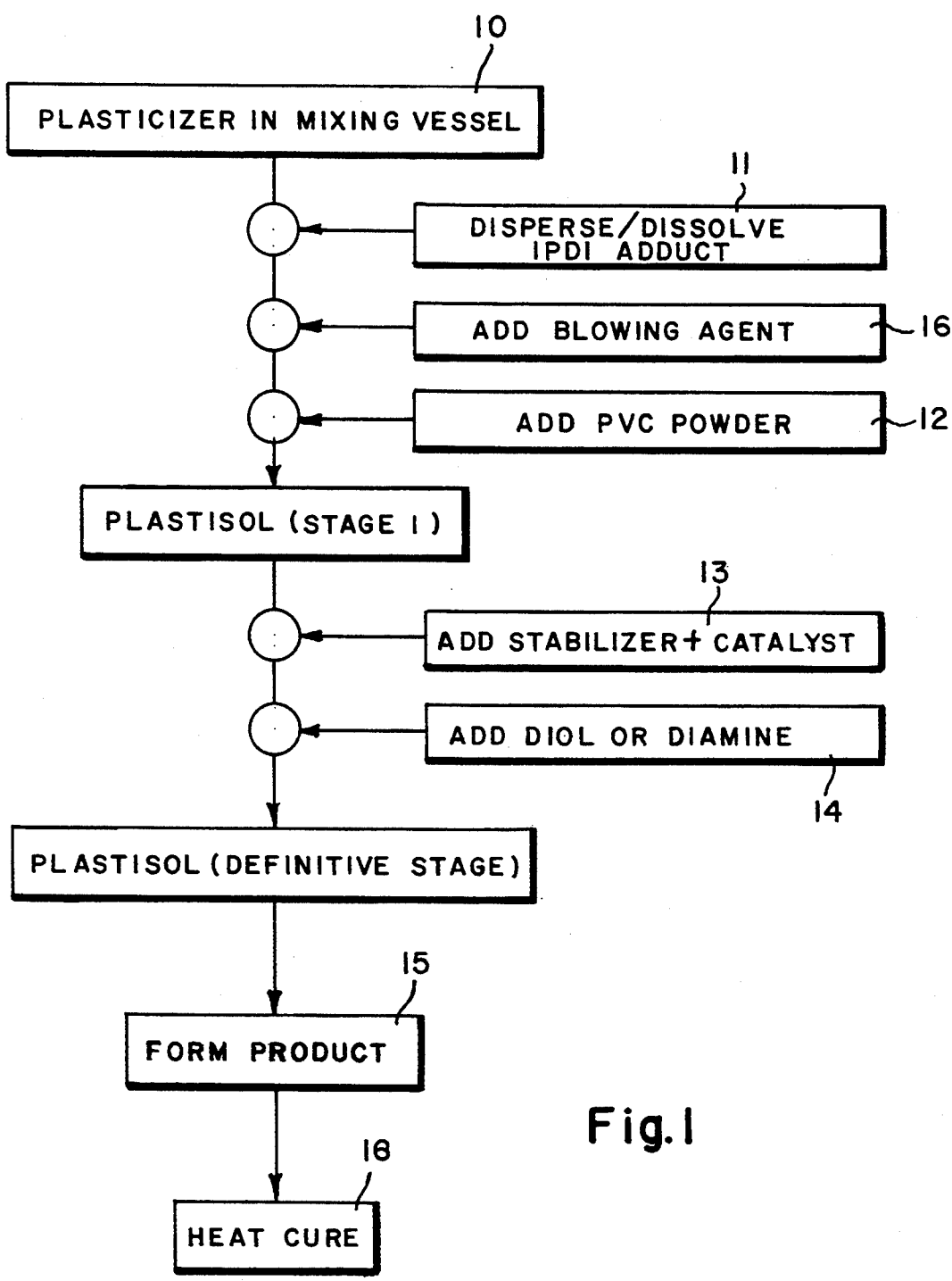
FIG. 1 is a flow chart of the steps in a first process for forming the modified PVC product incorporating the principles of the present invention.

Referring first to FIG. 1 which shows the general procedures of preparing an article of this invention. The process, indicated generally by the reference numeral 10, consists of a first step 11 of forming a first mixture of a blocked poly-isocyanate-containing prepolymer with a plasticizer. A second step 12 forms a second mixture of the first mixture and emulsion or microsuspension prepared PVC particles to form stage 1 of the plastisol. The third step (13 and 14) consists of combining the stage 1 plastisol with a diol or a diamine, and the addition of a stabilizer and a catalyst. The fourth step 15 forms the product from the plastisol of the third step and beginning the gel of the PVC. The product is then heat cured in step 16. An alternative step 17 can take place between step 11 and step 12 by adding a foaming agent and initiator to the mixture to cause the final product to be foamed.

Figure 4:
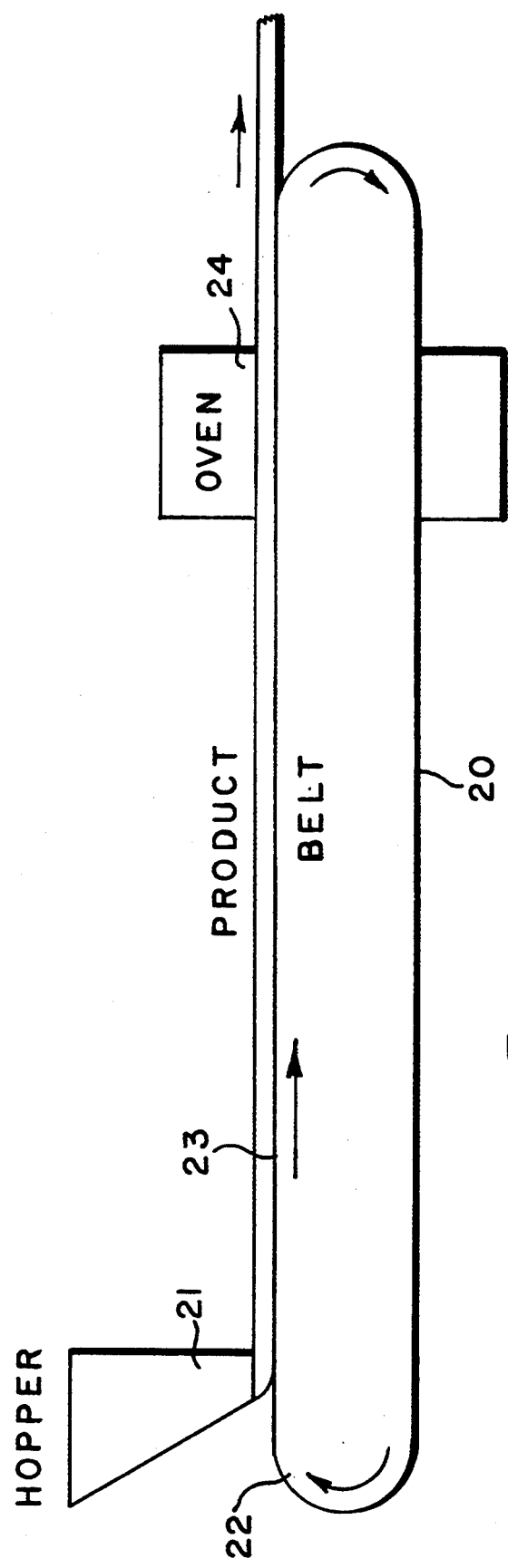
FIG. 4 is a schematic view of apparatus for forming a product from a modified PVC plastisol composition.

FIG. 4 shows an apparatus 20 for completing the formation of the improved PVC product. The final fluid mixture from the process is placed in a hopper 21 and passes onto a belt 22 to form a product 23 in the form of a coating. The product is carried downstream to an oven 24 where complete gelling and curing takes place.

Figure 2:
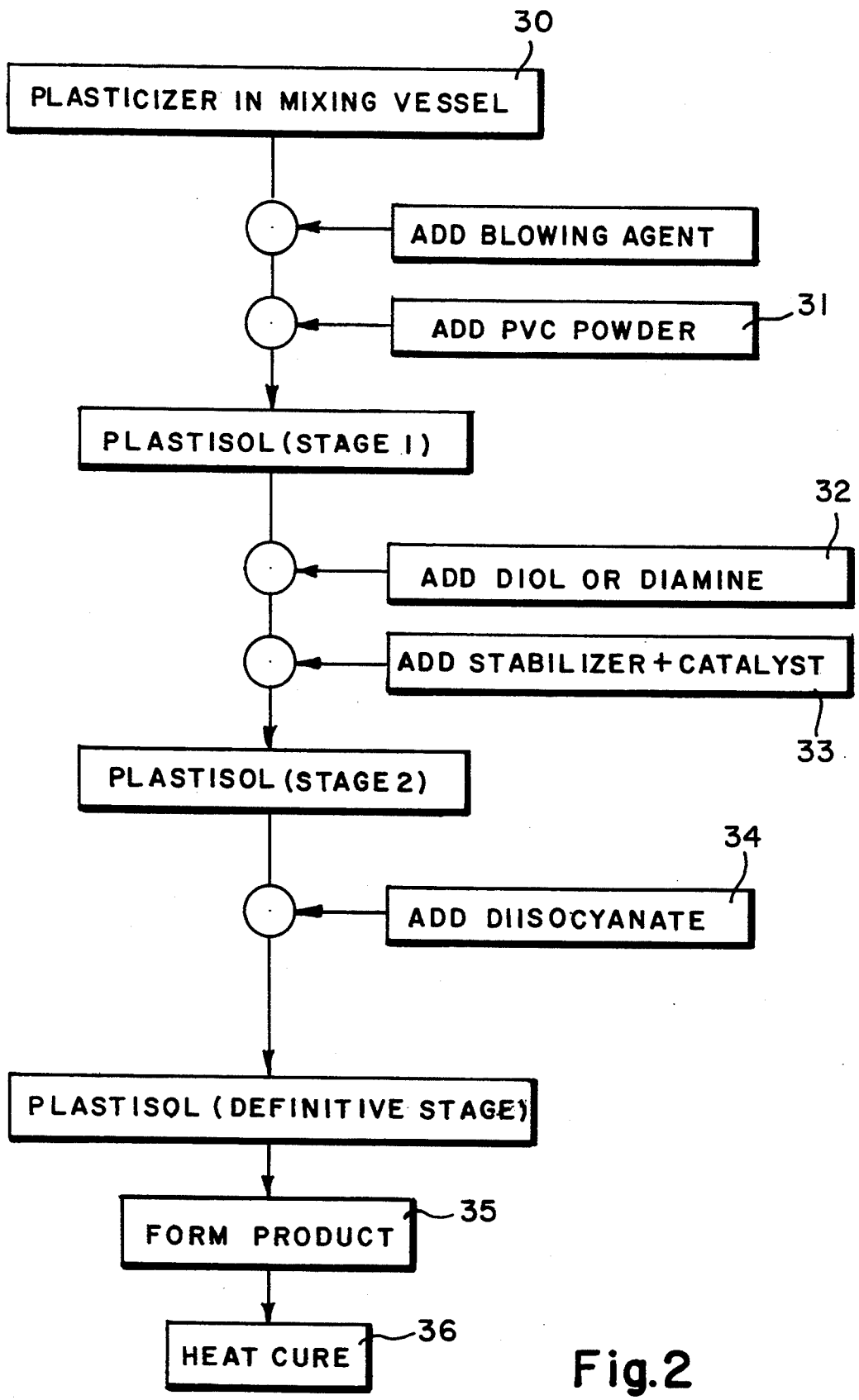
FIG. 2 is a flow chart of the steps in a second process.

FIG. 2 shows a modified form of the process, indicated generally by the reference numeral 30 in which as the first step 31 a PVC emulsion or microsuspension polymerized powder is mixed with the plasticizer. A blowing agent may be added at that time if a foamed product is desired. This mixture constitutes Stage 1 of the plastisol. The second step 32 consists in adding a polyol or polyamine, followed by the third step 33 of adding the stabilizer and catalyst. This results in Stage 2 of the plastisol. The fourth step 34 consists of the addition of a polyisocyanate. In the fifth step 35, the product is formed into the desired shape article and in the sixth step 36 the PVC in the product is gelled and the polyisocyanate reacts with the polyol or polyamine and cures into a network. The steps 35 and 36 can be carried out on the apparatus shown in FIG. 4.

Figure 3:
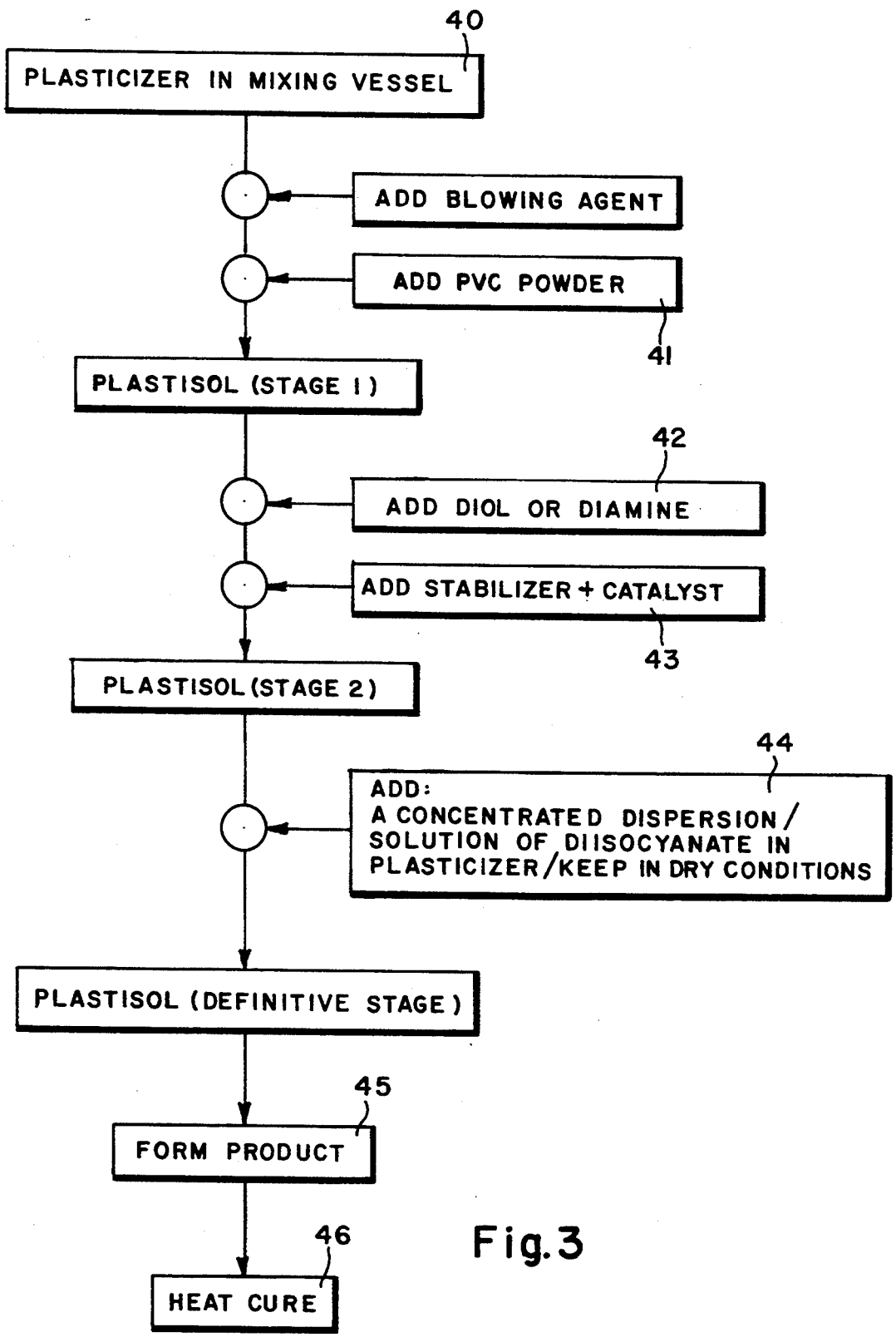
FIG. 3 is a flow chart of the steps in a third process.

FIG. 3 shows a still further variation of the process, designated in general by the reference numeral 40. The first step 41 consists of mixing the PVC with the plasticizer. At this stage, a blowing agent may be added to the mixture if a foamed product is desired. The second step 42 consists of adding to the mixture the polyol or the polyamine. The third step 43 consists of adding the stabilizer and the catalyst to the mixture. The fourth step 44 consists of making a concentrated dispersion or solution of an unblocked polyisocyanate in plasticizer and keeping it in a dry condition until it is added to the plastisol immediately prior to actual article-forming use. The final fluid plastisol is formed in the fifth step 45 into the product. In the sixth step 46 the product is gelled and cured. Steps 45 and 46 can be carried out on the apparatus shown in FIG. 4.

FIG. 5 shows a generalized view of the present invention in the form of a process, indicated generally by reference numeral 50. In step 51, a first composition is formed which includes a first polyisocyanate prepolymer and may include some of the other components of the final mixture. In step 52, a second composition is formed which may include a second prepolymer which is polymerizable with the first prepolymer, and may include other components of the final mixture. In step 53, the first composition and second composition are mixed to form a final mixture which is a mixture of a plastisol system and a polymerizable polyisocyanate system. In step 54, the final mixture is caused to polymerize to form a polyvinyl chloride article containing a polyurethane or polyurea network therein.

The articles of this invention are thus prepared from a fluid composition which comprises (i) polyvinyl chloride particles, (ii) sufficient plasticiser to form a plastisol from the PVC, (iii) a blocked polyisocyanate, and (iv) a polyol or a polyamine.

The polyvinyl chloride particles are prepared by drying particles produced by the emulsion or microsuspension polymerization of vinyl chloride. These particles are distinguished in the PVC art from the particles produced by a conventional suspension or bulk polymerization procedure since they are much smaller and have a much higher surface area. As a result, a much larger amount of plasticizer can be incorporated therewith to produce a more flexible final product. The PVC grains produced by an emulsion or microsuspension polymerization are normally within the range of about 2-70 microns and have mean particle sizes of about 10-40 microns. Suspension polymerized grains, on the other hand, have mean particle sizes of about 120-160 microns and bulk polymerized grains about 100-150 microns.

The amount of plasticizer used herein is generally at least about 50% of the weight of the PVC, more usually at least about 75% thereof, and most preferably about 80-110% thereof. The maximum amount is limited by the intended end use of the final article, but generally rarely exceeds about 150% of the weight of the PVC.

The blocked polyisocyanate and the polyol or polyamine are used in substantially stiochiometric amounts to produce the intended polyurethane or polyurea, as is well known in those arts. To produce the desired final products of the present invention the two reactants are used in a total amount of at least about 20% of the weight of the PVC. More improved results occur when the amount of the reactants is at least about 50%, still more preferably about 90-110%, of the weight of the PVC.

A particularly preferred composition for use herein comprises about 80-110 parts of plasticizer and about 80–110 parts of network-forming reactants per 100 parts of PVC.

In the examples below, the PVC was an emulsion polymerized polyvinyl chloride with a K value between 68 and 75 (more preferably 74) manufactured and sold by SOLVAY under the trademark SOLVIK 374 MB or 372 HA. The plasticizers were a mixture of phthalate plasticizers, including BBP (butylbenzylphthalate) sold by Monsanto under the trademark SANTICIZER 160; DIDP (diisodecylphthalate) sold by UCB, and a phosphate plasticizer TCP (tricresylphosphate) sold by Bayer AG, under the trademark DISFLAMMOL TKP.

The stabilizers consisted of epoxidized soybean oil sold by Lankro under the trademark LANKROFLEX GE and a barium/cadmium compound sold by Atochem under the trademark STAVINOR BC 731.

The blocked diisocyanate was IDPI or isophorone diisocya-nate-3-isocyanatomethyl-3,5,5-trimethylcyclohexylisocyanate, which was used as in various forms as a simple diisocyanate, a polymer thereof, and as the e-caprolactame adduct. These polyisocyanates are all sold by Huls under the trademarks IPDI, IPDI B1540, and IPDI B1530, respectively.

The polyol was poly-ε-caprolactone sold by Solvay under the trademark CAPA 316.

The catalyst used was tin dibutyldilauryl sulfate sold by Air Products under the trademark DABCO T12. The blowing agent was GENITRON AC SP4 sold by Shering Industrial Chemicals and the activator was FERRO 5473A sold by Ferro (Holland) BV.

In a practical application of the process, the ingredients were thoroughly mixed by addition of the PVC to the plasticizer in a high speed mixer in the desired proportions. The reverse addition of plasticizer to PVC would result in an initially unstirrable mixture. The final temperature of the various mixtures was about 30° C. and the viscosity was typically from about 2,000 to 25,000 centipoises as measured with a Brookfield Viscosimeter using Spindle 5 at 20 rpm. The mixtures were then cast on a release conveyor belt with a gap of between 0.2 and 2.5 millimeters. The cast films were heat treated in an oven for from 1 to 10 minutes at 205° C. The resulting foamed sheets had densities of 150±50 kg/m$^3$ and thicknesses of 1.5 to 20 millimeters. In the case of the unfoamed products, the densities were 1200±50 kg/m$^3$ and the thicknesses 0.2 to 2.5 mm.

The following tests were performed on various samples:

The gel content was determined by placing a precisely weighed portion of the composition placed in a container made of 200 mesh screen suspended in a boiler and arranged so that a rapid flow of refluxing cyclohexanone passed through the screen and over the sample. After one hour of exposure, the undissolved portion of the sample was removed, the solvent removed from the sample by heating, and the sample reweighed. The "percent unextracted" is 100 times the ratio of the weights of the extracted sample to the original sample.

The tensile strength and modulus were determined with die-cut sheet samples in accordance with ASTM D-412 using an Instron 1122 at a speed of 100 mm/min at various temperatures.

The creep resistance was determined using samples diecut according to ASTM D-412 from 1 mm thick sheet. A 100 g weight was hung at one end of the sample while the other end was fixed in an oven at 100° C. The elongation was measured after 30 sec. The results are expressed by dividing the elongation by the tension calculated in N/mm$^2$.

The plasticizer migration was determined by placing a 1 mm thick sheet against a 100 micron thick polycarbonate film (sold by General Electric under the trademark LEXAN) at 50° C. for increasing periods of time. After removal of the sheet sample, the polycarbonate film was analyzed by transmission using an IR Perkin Elmer 781, scanning 3 min slit 1. The intensity of the peak at 1710 cm$^{-1}$ (from phthalate or phosphate plasticizer) was divided by the intensity of the peak at 1765 cm$^{-1}$ (from carbonyl in polycarbonate).

For foamed samples, the compression set was measured after 25% compression at the indicated temperature for 22 hrs, followed by 24 hrs recovery at room temperature, according to ASTM D-1667-76.

EXAMPLE I

Samples 1 through 5 were prepared using the compositions as per Table 1. The tensile properties are reported in Table 2 and other properties in Table 3. The compositions are expressed in parts by weight.

TABLE 1

| | COMPOSITIONS | | | | |
|---|---|---|---|---|---|
| | Samples | | | | |
| Ingredients | 1 | 2 | 3 | 4 | 5 |
| PVC (Solvic 372HA) | 100 | 100 | 100 | 100 | 100 |
| TCP (Plasticizer) | 90 | 90 | 90 | 90 | 90 |
| Epoxidized Soybean Oil | 10 | 10 | 10 | 10 | 10 |
| Ba/Cd Stabilizer | 0.5 | 0.5 | 0.5 | 0.5 | 0.5 |
| CAPA 316 | 0 | 5.5 | 11 | 48 | 64 |
| IPDI | 0 | 6 | 12 | 52 | 69 |
| DABCO T12 | 0 | 0.5 | 0.5 | 0.5 | 0.5 |
| Film Quality (*) | S | S | S | S | GI |

(*) S = Smooth
GI = Gas Inclusion

TABLE 2

| | TENSILE PROPERTIES | | | | |
|---|---|---|---|---|---|
| | Samples | | | | |
| | 1 | 2 | 3 | 4 | 5 |
| Retention of Tensile Strength with Temperature (N/cm$^2$) at: | | | | | |
| 23° C. | 8.5 | 5.1 | 7.9 | 6.3 | 2.4 |
| 100° C. | >0.79 | >0.63 | 0.69 | 0.9 | 0.28 |
| 110° C. | >0.49 | 0.40 | 0.49 | 0.78 | 0.22 |
| 120° C. | 0.28 | 0.25 | 0.32 | 0.41 | 0.24 |
| Retention of Tensile Strength (%) with Temperature | | | | | |
| 100° C. | 9.3 | 12.4 | 8.7 | 14.3 | 11.7 |
| 110° C. | 5.8 | 7.8 | 7.2 | 12.4 | 9.2 |
| 120° C. | 3.3 | 4.9 | 4.1 | 6.5 | 10.0 |
| Retention of Modulus at 50% Elongation with Temperature Elongation (N/cm$^2$) at: | | | | | |
| 23° C. | 1.8 | 1.8 | 2.4 | 3.8 | 1.34 |
| 100° C. | 0.21 | 0.21 | 0.46 | 0.92 | 0.21 |
| 110° C. | 0.14 | 0.17 | 0.40 | 0.86 | 0.20 |
| 120° C. | 0.08 | 0.14 | 0.32 | 0.76 | 0.18 |
| Retention of Modulus at 5% Elongation (%) with Temperature | | | | | |
| 100° C. | 11.7 | 11.7 | 19.2 | 24.2 | 15.7 |
| 110° C. | 7.8 | 9.4 | 16.7 | 22.6 | 14.9 |
| 120° C. | 4.4 | 7.8 | 13.3 | 20.0 | 13.4 |

TABLE 3

| | OTHER PROPERTIES | | | | |
|---|---|---|---|---|---|
| | Samples | | | | |
| | 1 | 2 | 3 | 4 | 5 |
| Creep Resistance (mm) | 314 | 250 | 134 | 115 | — |
| Gel Content (%) | 0 | 3 | 12 | 30 | 50 |
| Plasticizer Migration (Peak ratio after various periods) (1) | | | | | |

TABLE 3-continued

OTHER PROPERTIES

| | Samples | | | | |
|---|---|---|---|---|---|
| | 1 | 2 | 3 | 4 | 5 |
| 0 day | 0 | | | 0 | |
| 1 day | 0.69 | | | 0.11 | |
| 2 days | 1.74 | | | 0.22 | |
| 7 days | 1.93 | | | 0.17 | |
| 8 days | 2.14 | | | 0.25 | |
| 11 days | 2.10 | | | 0.38 | |
| 14 days | 1.93 | | | 0.38 | |

(1) The TCP plasticizer of Table I was replaced with an equal amount of butylbenzylphthalate (BBP).

EXAMPLE II

Samples 6–9 were prepared in accordance with the procedure of Example I except using the compositions indicated in Table 4.

TABLE 4

| | Samples | | | |
|---|---|---|---|---|
| | 6 | 7 | 8 | 9 |
| Ingredients | | | | |
| PVC (Solvic 372HA) | 100 | 100 | 100 | 100 |
| BBP Plasticizer | 90 | 90 | 90 | 90 |
| Epoxidised Soybean Oil | 10 | 10 | 10 | 10 |
| Ba/Cd Stabilizer | 0.5 | 0.5 | 0.5 | 0.5 |
| CAPA 316 | 0 | 48 | 48 | 48 |
| IPDI (unblocked) | 0 | 21 | 0 | 0 |
| IPDI 1530 | 0 | 0 | 52 | 0 |
| IPDI 1540 | 0 | 0 | 0 | 52 |
| DABCO T12 | 0 | 0.5 | 0.5 | 0.5 |
| Properties | | | | |
| Period of Fluidity at R.T. | ∞ | <30 min | >10 days | >10 days |
| Gel content | 0 | 60 | 29 | 31 |
| Film quality | S | GI | GI | S |

S = Smooth
GI = Gas inclusions

The Example demonstrates that both blocked and unblocked diisocyanates can be used. However, when unblocked isocyanates were used, the formulations remained fluid only for less than about ½ hour after their incorporation in the formulations.

EXAMPLE III

Another application of flexible PVC using the technology of this invention is in preparing foamed gaskets. The modified PVC in addition to the normal ingredients further includes a chemical blowing system. As per Table 5, the temperature limitation of the standard compound appears as a set that the foam takes after it has been compressed under temperature (referred to as Compression Set). Samples 10 and 11 were prepared using the compositions shown in Table 5 and the Compression Set was measured.

TABLE 5

| | Samples | |
|---|---|---|
| | 10 | 11 |
| Ingredients | | |
| PVC Solvic 374 MB | 100 | 100 |
| DIDP | 100 | 100 |
| BBP | 25 | 25 |
| Genitron AC SP4 | 10 | 10 |
| Ferro 5473A | 0.75 | 0.75 |
| CAPA 316 | 0 | 19 |
| IPDI 1530 | 0 | 23 |
| DABCO | 0 | 0.50 |
| Properties | | |
| Specific Gravity (kg/m³) | 105 | 114 |

TABLE 5-continued

| | Samples | |
|---|---|---|
| | 10 | 11 |
| Compression set at | | |
| 23° C. | 12 | 7 |
| 50° C. | 61 | 50 |
| 70° C. | 100 | 60 |

The techniques described herein are applicable to substantially all PVC particles and plasticizers which are suitable for use in the preparation of plastisols.

Other blocked di- or polyisocyanates, other di- or polyols, and other di- or polyamines can also be used. More generally, all constituents of polyurethanes (reaction products of polyisocyanates and polyols) and polyureas (reaction products of polyisocyanates and polyamines) can be used. Furthermore, the invention can be practiced by starting with a blocked adduct (prepolymer) of a polyisocyanate with a polyol or polyamine or with blocked monomeric or polymeric polyisocyanates.

As a general matter, the type of polyisocyanate dictates what process should be used. There are two criteria which tend to link a type of polyisocyanate to a type of process:

(a) The speed of reaction/stability of the isocyanate as a function of the ambient moisture in the presence of a diol or diamine will vary depending upon the type of isocyanate. By utilizing the blocked diisocyanates of the invention, the resulting systems are very stable (many days at room temperature). The activity of the blocked isocyanates is triggered by exposure to the same type of high oven temperature that will cause gellation of the PVC plastisol component. Since aliphatic isocyanates are relatively slower reacting than are aromatic isocyanates, suitable selection can further control the stability of the modified plastisol formulations.

(b) The dispersability/dissolution speed of the isocyanate in either the plasticizer or in the plastisol leads to the preferred use of fluid, liquid isocyanates due to their ease and speed of dispersion in large amounts of viscous liquids. Correspondingly, the use of isocyanates which are solid, crystal, or viscous liquids often require long mixing in a fluid diluent.

Standard plastisol additives such as fillers, pigments, biocides, extenders (PVC copolymers, ethylene-vinyl acetate copolymers, nitrile rubber, etc.) viscosity depressors and/or stabilizers, etc. can be used in the present invention.

One class of special ingredients of particular interest are the PVC plasticizers which have amino, hydroxy, or isocyanate groups which are reactive. By extending the polymerization step of the present invention so as to partially include the plasticizer, an "in-situ" polymeric plasticizer could be produced which would further reduce plasticizer migration. Currently known polymeric plasticizers are too viscous to even be mixed into plastisol compositions and thus are now only available in PVC extrusion or calendaring produced products.

Examples given above are only representative of limited applications (sheet and foam gaskets), as the invention is also clearly applicable to other PVC processing techniques which include dip coating (e.g., for gloves), wire basket coating, etc.

While it will be apparent that the illustrated embodiments of the invention herein disclosed are calculated adequately to fulfill the objects and advantages primarily stated, it is to be understood that the invention is susceptible to variation, modification, and change within the spirit and scope of the subjoined claims.

What is claimed is:

1. An article made from a modified polyvinyl chloride plastisol composition which comprises a mixture of polyvinyl chloride particles having a mean particle size of about 10 to 40 microns, a plasticizer therefor, and an in situ formed reaction product of a first reactant selected from the group consisting of blocked diisocyanates, blocked polyisocyanates, and mixtures thereof, with a second reactant selected from the group consisting of diols, polyols, diamines, polyamines, and other di- and polyfunctional molecules which react with isocyanates wherein said reaction product forms a polymer network throughout the polyvinyl chloride plastisol.

2. The article of claim 1, wherein said polymer network is a polyurethane.

3. The article of claim 1, wherein said polymer network is a polyurea.

4. The article of claim 1, wherein said polymer network is a mixture of a polyurethane and a polyurea.

5. The article of claim 1, wherein said article is a gasket.

6. The gasket of claim 5, wherein said modified polyvinyl chloride plastisol composition is foamed.

7. The article of claim 1, wherein said article is a sheet.

8. The sheet of claim 7, wherein said modified polyvinyl chloride plastisol composition is foamed.

9. The article of claim 1, wherein said modified polyvinyl chloride plastisol composition comprises about 50 to 150 parts of plasticizer and about 20 to 110 parts of the in situ formed reaction product, each per 100 parts of polyvinyl chloride.

10. The article of claim 9, wherein said modified polyvinyl chloride plastisol composition comprises about 80 to 110 parts of plasticizer and about 80 to 110 parts of the in situ formed reaction product, each per 100 parts of polyvinyl chloride.

11. The article of claim 1, wherein the plasticizer contains a reactive group selected from the group consisting of amino, hydroxy, and isocyanate groups.

12. The article of claim 11, wherein the plasticizer contains an active amino group.

13. The article of claim 11, wherein the plasticizer contains an active hydroxy group.

14. The article of claim 11, wherein the plasticizer contains an active isocyanate group.

* * * * *